United States Patent [19]

Tatemichi et al.

[11] Patent Number: 5,128,693
[45] Date of Patent: Jul. 7, 1992

[54] INFORMATION RECORDING APPARATUS

[75] Inventors: Hidetoshi Tatemichi, Chofu; Manabu Yamamoto, Sayama, both of Japan

[73] Assignee: Nippon Telegraph & Telephone Corporation, Tokyo, Japan

[21] Appl. No.: 757,894

[22] Filed: Sep. 11, 1991

[30] Foreign Application Priority Data

Sep. 14, 1990 [JP] Japan .................................. 2-244829
Sep. 18, 1990 [JP] Japan .................................. 2-246033
Mar. 25, 1991 [JP] Japan .................................. 3-60252
Apr. 1, 1991 [JP] Japan .................................. 3-68533

[51] Int. Cl.$^5$ ................................. G01D 9/42
[52] U.S. Cl. ................................. 346/108; 359/538; 359/22
[58] Field of Search ............. 346/108, 107 R, 110 R, 346/76 C; 359/287, 22, 537, 538

[56] References Cited

U.S. PATENT DOCUMENTS 3,935,566  1/1976  Snopko ............................. 372/18
4,768,852  9/1988  Ih ..................................... 359/287
4,843,335  6/1989  Amano .............................. 359/310

OTHER PUBLICATIONS

"Experimental Holographic Read-Write Memory Using 3-D Storage" by L. d'Auria et al, pp. 808-818; Applied Optics, vol. 13, No. 4, Apr. 1974.

*Primary Examiner*—Mark J. Reinhart
*Attorney, Agent, or Firm*—Frishauf, Holtz, Goodman & Woodward

[57] ABSTRACT

An information recording apparatus includes an acoustooptic deflector, receives a laser beam from a recording light source and an amplitude modulation signal, and diffracts the laser beam in two directions, thereby generating a carrier wave diffracted beam and a lower sideband diffracted beam. The carrier wave diffracted beam is provided with information by a spatial light modulator and modulated, and is incident, as a signal beam, on a moving recording medium. The lower sideband diffracted beam is incident, as a reference beam, on the same incident region as that of the signal beam. The two beams interfere with each other, and multiplexed recording of a hologram is performed on the recording medium.

7 Claims, 7 Drawing Sheets

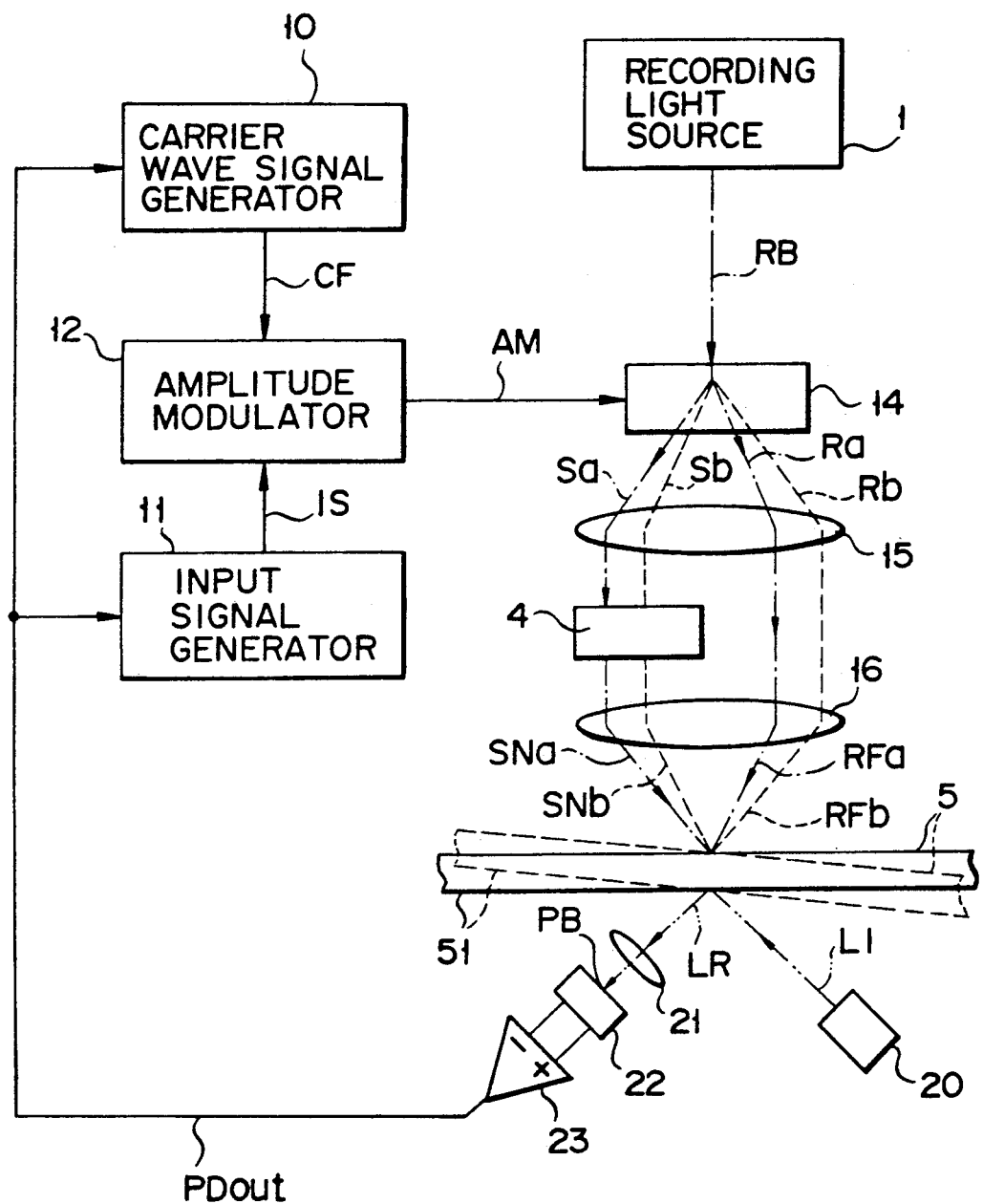
F I G. 6

INFORMATION RECORDING APPARATUS

BACKGROUND OF THE INVENTION

1. Field of the Invention

The present invention relates to an apparatus for recording information as a hologram by using interference between two light beams and, more particularly, to an information recording apparatus which can perform multiplexed recording of high-quality holograms on a moving medium.

2. Description of the Related Art

A rewritable optical disk as an information recording apparatus has been increasingly used mainly as an external storage medium of a computer system, in place of a magnetic disk and the like. Such an optical disk has a recording density of about $5 \times 10^5$ bit/mm$^2$ as its basic performance. That is, a 5-inch optical disk has a storage capacity corresponding to 3,300 pages of newspapers.

With advances in information communication techniques, however, demands have arisen for information storage techniques allowing high-rate data transfer with higher density. Especially in the field of image communication services proposed as a future service vision, an ult6ra-high-speed (1 Gbit/sec), high-density ($10^8$ bit/mm$^2$) storage system is required to handle storage of a large of a large amount of information of, e.g., high-resolution color motion images, multi-screen images, and stereoscopic images, and high-speed retrieval of data from databases. In order to handle such operations, studies are currently undertaken in various institutions to increase the recording density by means of a short-wavelength laser and to increase the data transfer rate by means of multiple beams. With regard to the recording density, however, even if a recording/reproduction scheme using a short-wavelength laser is realized, it is expected that the density limit is about 10 times that of a currently used optical disk at best. In addition, since the recording principle is so-called thermal recording based on heating/cooling processes of a medium using radiation of a laser beam, the recording density is also limited by thermal interference between bits. With regard to the transfer rate, a great improvement in performance cannot be achieved in principle in a conventional bit-by-bit recording/reproduction scheme because of limitation in the number of multiple beams.

As described above, in a storage system using conventional optical disks, a great improvement in performance, in terms of recording density and data transfer rate, cannot be expected. In order to overcome such limitations, a new storage scheme must be established, which can achieve an increase in recording density by means of multiplexed recording and an increase in transfer rate by means of collective processing of a plurality of bits.

The basic arrangement of an apparatus for collective recording/reproduction of two-dimensional digital information by a holographic recording scheme is disclosed in, e.g., L. d'Auria, J. P. Huignard, C. Slezak, and E. Spitz, "Experimental Holographic Read-Write Memory Using 3-D Storage", APPLIED OPTICS, vol. 13, No. 4, April 1974, pp. 808-810.

According to this study, a laser beam is diffracted by an acoustooptic element capable of two-dimensional beam deflection. The primary diffracted beam is split into two beams in two directions by a beam splitter. One beam is collimated by a collimator lens and is subsequently addressed to a specific lens of a lens array. In a page composer, a two-dimensional bit pattern constituting one-page information is formed. The beam spread by the addressed lens of the lens array is radiated on the page composer to be formed into a signal beam. The signal beam is focused on a point on a holographic recording medium by a Fourier transform lens. The other beam formed by the beam splitter is superposed, as a reference beam, on the focus position of the signal beam on the recording medium by an electrooptic element and a holographic diffraction grating. In this manner, the two-dimensional digital information formed by the page composer is recorded as a minute hologram.

In order to form a hologram at a different position on the recording medium, the primary diffracted beam is deflected in a direction different from that mentioned above by using the acoustooptic element. As a result, the minute holograms are arranged on the stationary recording medium in the form of a two-dimensional matrix. In addition, by deflecting only the reference beam using the electrooptic element, multiplexed recording of a hologram having different information can be performed at the position of the already recorded hologram.

In reproduction, when the minute holograms are accessed by the reference beam used in recording, the holograms are collectively reproduced, and the two-dimensional bit pattern formed by the page composer is detected by a detector array.

In such a scheme, however, a complicated optical system is required to access an arbitrary hologram and convert a reference beam angle in angle multiplexed recording. Therefore, a high-speed, high-precision access of a beam is difficult to perform. In addition, since there is no exchange function of recording media, the storage capacity is limited by the number of resolvable spots of an acoustooptic deflector or an array lens number.

SUMMARY OF THE INVENTION

The present invention has been made in consideration of the above situation, and has as its object to provide an information recording apparatus which can perform high-precision, high-speed multiplexed recording of two-dimensional information on a moving medium.

In order to achieve the above object, according to the present invention, there is provided an information recording apparatus comprising:

a recording light source for generating a laser beam;
carrier wave generating means for generating a carrier wave having a predetermined frequency;
input signal generating means for generating an amplitude modulation input signal having a frequency different from that of the carrier wave;
amplitude modulating means, connected to the carrier wave generating means and the input signal generating means, for performing amplitude modulation of the carrier wave with the input signal;
acoustooptic deflecting means, connected to the amplitude modulating means, for receiving the laser beam from the recording light source and diffracting the laser beam in two directions by using an amplitude-modulated signal from the amplitude modulating means;
diffracted beam modulating means for providing pre-diffracted determined information for one of the diffracted beams, of the laser beam, diffracted by the acoustooptic deflecting means in one direction by the acoustooptic deflecting means, and modulating the diffracted beam to form a signal beam; and movable recording medium means, on the same incident region of which the signal beam from the diffracted beam modulating means and the diffracted beam as a reference beam, of the laser beam, diffracted by the acoustooptic deflecting means in a direction different from a direction of diffraction of the signal beam are radiated, thereby performing recording based on interference between the signal beam and the reference beam.

In the information recording apparatus of the present invention, the shift amounts of the frequencies of the diffracted beams diffracted in different directions, i.e., the carrier wave diffracted beam and the sideband diffracted beam, are different from each other because of the Doppler effect caused by a travelling supersonic wave in the acoustooptic deflecting means. For this reason, interference fringes generated by interference of these diffracted beams move relative to a stationary recording medium. If the recording medium is continuously moved in the moving direction of the interference fringes at the same speed as that of the moving speed of the interference fringes, the movement of the interference fringes can be relatively stopped on the recording medium. Therefore, holographic recording can be performed on a medium moving at a constant speed. In addition, by switching the amplitude modulation frequency to a different frequency, only the angle of diffraction of a sideband diffracted beam can be changed. As a result, the angle of incidence of the reference beam on the recording medium surface can be switched to another angle to enable high-speed multiplexed recording.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a block diagram showing an apparatus capable of compensating for axial runout or warpage caused upon movement of a medium according to still another embodiment of the present invention;

DETAILED DESCRIPTION OF THE PREFERRED EMBODIMENTS

Figure 1:
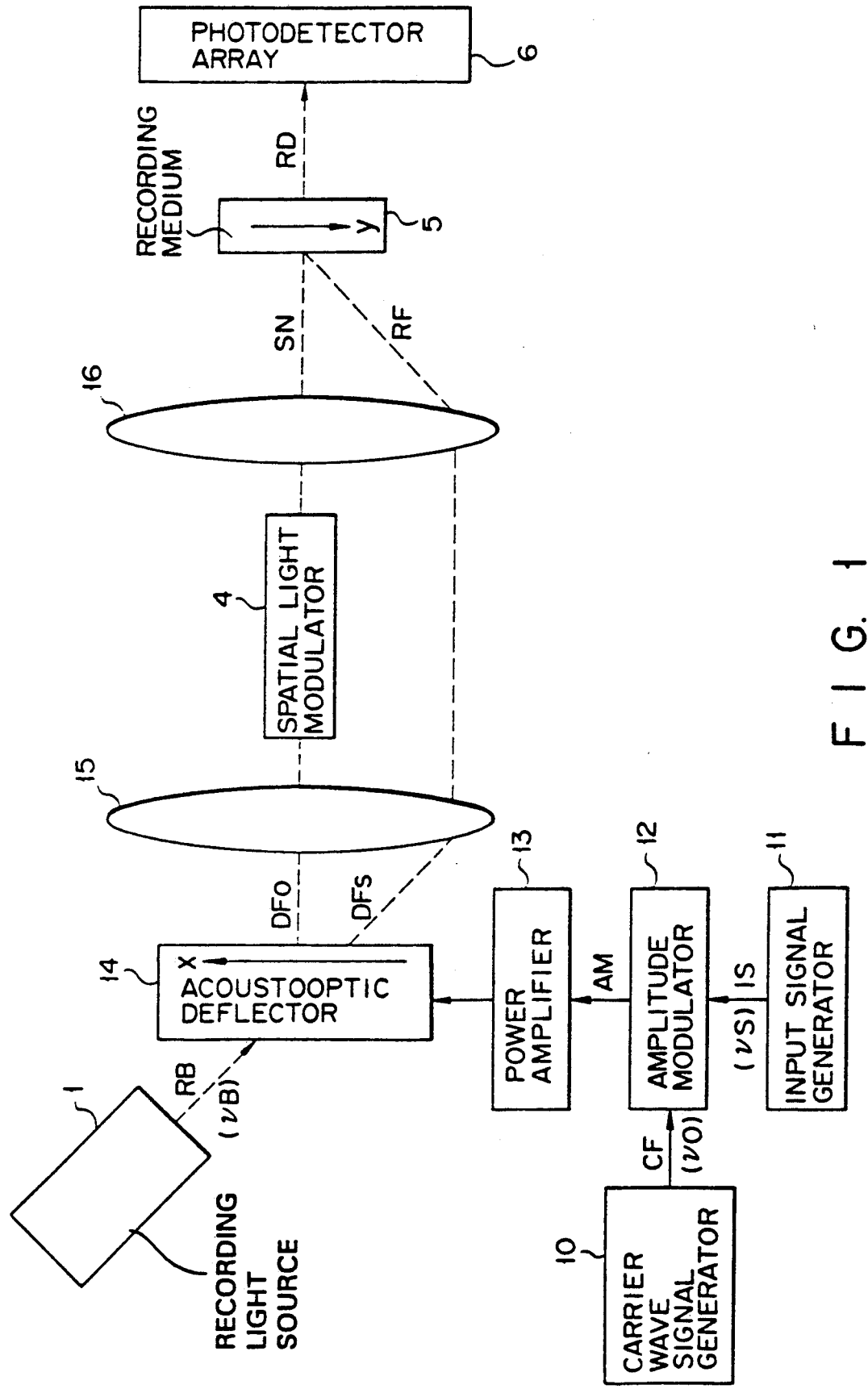
FIG. 1 is a block diagram showing the basic arrangement of an information recording apparatus according to an embodiment of the present invention.

An embodiment of the present invention will be described below with reference to the accompanying drawings. FIG. 1 shows the basic arrangement of an information recording apparatus of the present invention. Referring to FIG. 1, reference numeral 1 denotes a recording light source constituted by, e.g., a laser having an optical frequency $\nu_B$; 4, a spatial light modulator for modulating one diffracted beam $DF_0$ (to be described later) to provide two-dimensional information therefor and outputting the beam as a signal beam SN; 5, a movable recording medium on which information as a hologram is recorded upon incidence of the signal beam SN and a reference beam RF; and 6, a photodetector array for detecting a reconstructed beam RD when recorded information is reproduced.

Reference numeral 10 denotes a carrier wave generator for generating a carrier wave CF having a frequency $\nu_0$.

Reference numeral 11 denotes an input signal generator for generating an amplitude modulation input signal IS having a frequency $\nu_S$.

Reference numeral 12 denotes an amplitude modulator for amplitude-modulating the carrier wave CF with the input signal IS to generate frequency components $\nu_0$ (carrier wave), $\nu_0 - \nu_S$ lower sideband), and $\nu_0 + \nu_S$ (upper sideband), and cutting the upper sideband of these frequency components by using a low-pass filter (not shown), thereby outputting an amplitude-modulated signal AM having the frequency components $\nu_0$ and $\nu_0 - \nu_S$.

Reference numeral 13 denotes a power amplifier for amplifying the amplitude-modulated signal AM supplied from the amplitude modulator 12 with a predetermined gain.

Reference numeral 14 denotes an acoustooptic deflector which is driven by the amplitude-modulated signal AM through the power amplifier 13. Upon incidence of a laser beam RB having the optical frequency $\nu_B$ from the recording light source 1, the acoustooptic deflector 14 generates a carrier wave diffracted beam $DF_0$ and a lower sideband diffracted beam $DF_S$ whose frequencies are respectively Doppler-shifted from $\nu_B$ by amounts corresponding to $\nu_0$ and $\nu_0 - \nu_S$.

Reference numeral 15 denotes a collimator lens having a focal length $f_1$ and designed to collimate diffracted beams $DF_0$ and $DF_S$ from the acoustooptic deflector 14 and cause the diffracted beam $DF_0$ to be incident on the spatial light modulator 4.

Reference numeral 16 denotes an objective lens having a focal length $f_2$ and designed to focus the signal beam SN from the spatial light modulator 4 and cause it to be incident on the recording medium 5. In addition, the objective lens 16 focuses the diffracted beam $DF_S$ passing through the collimator lens 15 to cause it to be incident, as a reference beam, on the incident region of the signal beam SN on the recording medium 5.

With the above-described arrangement, an information recording operation and holographic recording on a moving recording medium can be performed. The reasons for this will be sequentially described below.

The amplitude modulator 12 receives the carrier wave CF having the carrier frequency $\nu_0$, which is generated by the carrier wave generator 10, and the input signal IS having the frequency $\nu_S$, which is generated by the input signal generator 11.

The amplitude modulator 12 performs amplitude modulation of the carrier wave CF with the input signal IS. As a result, the frequency components $\nu_0$, $\nu_0 - \nu_S$ (lower sideband), and $\nu_0 + \nu_S$ (upper sideband) are generated. Of the generated frequency components, the upper sideband is removed by the low-pass filter (not shown), and the amplitude-modulated signal AM having the frequency components $\nu_0$ and $\nu_0 - \nu_S$ is output. This amplitude-modulated signal AM is amplified by the power amplifier 13 and is subsequently input to the acoustooptic deflector 14.

At the same time, the light beam RB having the optical frequency $\nu_B$ from the recording light source 1 is input to the acoustooptic deflector 14. As a result, the carrier wave diffracted beam $DF_0$ and the lower sideband diffracted beam $DF_S$ respectively Doppler-shifted from the frequency $\nu_B$ by amounts corresponding to $\nu_0$ and $\nu_0 - \nu_S$ are generated.

Amplitude distributions $\psi_0(x)$ and $\psi_S(x)$ of the carrier wave diffracted beam $DF_0$ having a frequency $\nu_B - \nu_0$ and the lower sideband diffracted beam $DF_S$ having a frequency $\nu_B(\nu_0 - \nu_S)$ are respectively represented by the following equations (1) and (2):

$$\psi(x) = A(x) \exp\{-2\pi i \nu_0 / V_a \cdot x\} \cdot \exp\{-2\pi i(\nu_B - \nu_0)t\} \tag{1}$$

$$\psi S(x) = a(x) \exp\{-2\pi i(\nu_0 - \nu_S)/V_a \cdot x\} \cdot \exp\{-2\pi i(\nu_B - \nu_0 + \nu_S)t\} \tag{2}$$

where $V_a$ is the velocity of a supersonic wave, and x is the coordinate axis set on the acoustooptic deflector 14. In this case, the traveling direction of a supersonic wave is defined as a positive direction.

These diffracted beams $DF_0$ and $DF_S$ are collimated by the collimator lens 15. Thereafter, one diffracted beam $DF_0$ passes through the spatial light modulator 4 to emerge as the signal beam SN.

The signal beam SN is focused by the objective lens 16 to be incident at a predetermined position on the recording medium 5. Meanwhile, the other diffracted beam $DF_S$ collimated by the collimator lens 15 is focused by the objective lens 16 to be incident as a reference beam RF, on the same incident region as the signal beam SN on the recording medium 5. As a result, the signal beam SN and the reference beam RF interfere with each other on the surface of the recording medium 5.

For the sake of descriptive convenience, assume that the bit pattern of the spatial light modulator 4 is all "1"s, i.e., all the luminous energy of the signal beam SN passes through the spatial light modulator 4. In this case, after the signal beam SN passes through the objective lens 16, a reference beam $RF(\psi_O)$ and a signal $SN(\psi_S)$ on a coordinate axis y spatially fixed on the recording medium 5 are respectively represented by the following equations (3) and (4):

$$\psi 0 (-y/M) = A(-y/M) \exp\{2\pi i \nu_0 / V_a \cdot (y/M)\} \cdot \exp\{-2\pi i(\nu_B - \nu_0)t\} \tag{3}$$

$$\psi S(-y/M) = a(-y/M) \exp\{2\pi i(\nu_0 - \nu_S)/V_a \cdot (y/M)\} \cdot \exp\{-2\pi i(\nu_B - \nu_0 + \nu_S)t\} \tag{4}$$

where M is the image formation magnification and is given by $M = f_2/f_1$.

If the coordinate axis fixed on the surface of the recording medium 5 is represented by y', the coordinate axis y is converted as represented by the following equation (5):

$$y = y' - V_d \cdot t \tag{5}$$

where $V_d$ is the moving speed of the recording medium 5.

The values $\psi_O$ and $\psi_S$, therefore, can be represented by the following equations (6) and (7):

$$\psi 0\{-(y' - V_d \cdot t)M\} = A\{-(y' - V_d \cdot t)/M\} \\ \exp(2\pi i \nu_0 / V_a \cdot (y' - V_d \cdot t)/M) \cdot \\ \exp\{-2\pi i(\nu_B - \nu_0)t\} \tag{6}$$

$$\psi S\{-(y' - V_d \cdot t)M\} = a\{-(y' - V_d \cdot t)/M\} \\ \exp(2\pi i(\nu_0 - \nu_S)/V_a \cdot \\ (y' - V_d \cdot t)/M) \cdot \exp - 2\pi i \\ (\nu_B - \nu_0 + \nu_S)t\} \tag{7}$$

A light intensity distribution after interference between the reference beam RF and the signal beam SN is represented by the following equation (8):

$$E(y) = \int_{-\infty}^{\infty} |\phi_0 + \phi_S|^2 dt \tag{8}$$

$$= \int_{-\infty}^{\infty} \{|A|^2 + |a|^2\} dt + 2 \int_{-\infty}^{\infty} A\{-y' - V_d \cdot t)/M\} \\ a\{-(y' - V_d \cdot t)/M\} \cdot \cos\{2 c \nu_S y'/(V_a M) \\ - 2\pi \nu_S V_d \cdot t/(V_a M) + 2\pi_S t\} dt$$

Assuming that Gaussian distributions are envelope functions for the amplitude distributions of the reference and signal beams RF and SN, the following equations can be established:

$$A\{-(y' - V_d \cdot t)/M\} = A_0 \exp\{-y' - V_d \cdot t)/w\}^2 \tag{9}$$

$$a\{-(y' - V_d \cdot t)/M\} = a_S \exp\{-y' - V_d \cdot t)/w\}^2 \tag{10}$$

where w is the beam radius.

If, therefore, equation (8) is substituted into equations (9) and (10), and $$V_a \cdot f_2 / f_1 = V_d \tag{11}$$

is set, equation (8) is rewritten as the following equations (12) and (13):

$$E(y) = \sqrt{(\pi/2)(w/Vd)}$$

$$\{A_0O^2 + a_s^2 - 2A_0a_s\cos(2\pi v_S Y/\lambda_s)\} \quad (12)$$

$$\lambda_s = V_s/V_d \quad (13)$$

Equations (12) and (13) represent that if the condition of equation (11) is satisfied, interference fringes are formed into fixed patterns on the surface of the moving recording medium 5 independently of a time dependent term.

As described above, according to this embodiment, two diffracted beams $DF_O$ and $DF_S$ having different frequencies, which are generated by acoustooptic diffraction, are used, and a medium is moved to cancel the movement of interference fringes formed by these two beams. Therefore, holograms can be recorded on a continuously-moving medium.

Note that the above-described result is obtained based on the assumption that the bit pattern of the spatial light modulator 4 is all "1"s, i.e., all the luminous energy of an incident beam passes through the spatial light modulator 4. If the spatial light modulator 4 has a random two-dimensional digital bit pattern, this bit pattern is Fourier-transformed by the objective lens 16, and then signal and reference beams interfere with each other. As a result, a hologram is recorded. In this case, if the condition of equation (11), i.e., $V_a \cdot f_2/f_1 = V_d$, is satisfied the hologram is recorded on the surface of the recording medium 5.

Figure 2:
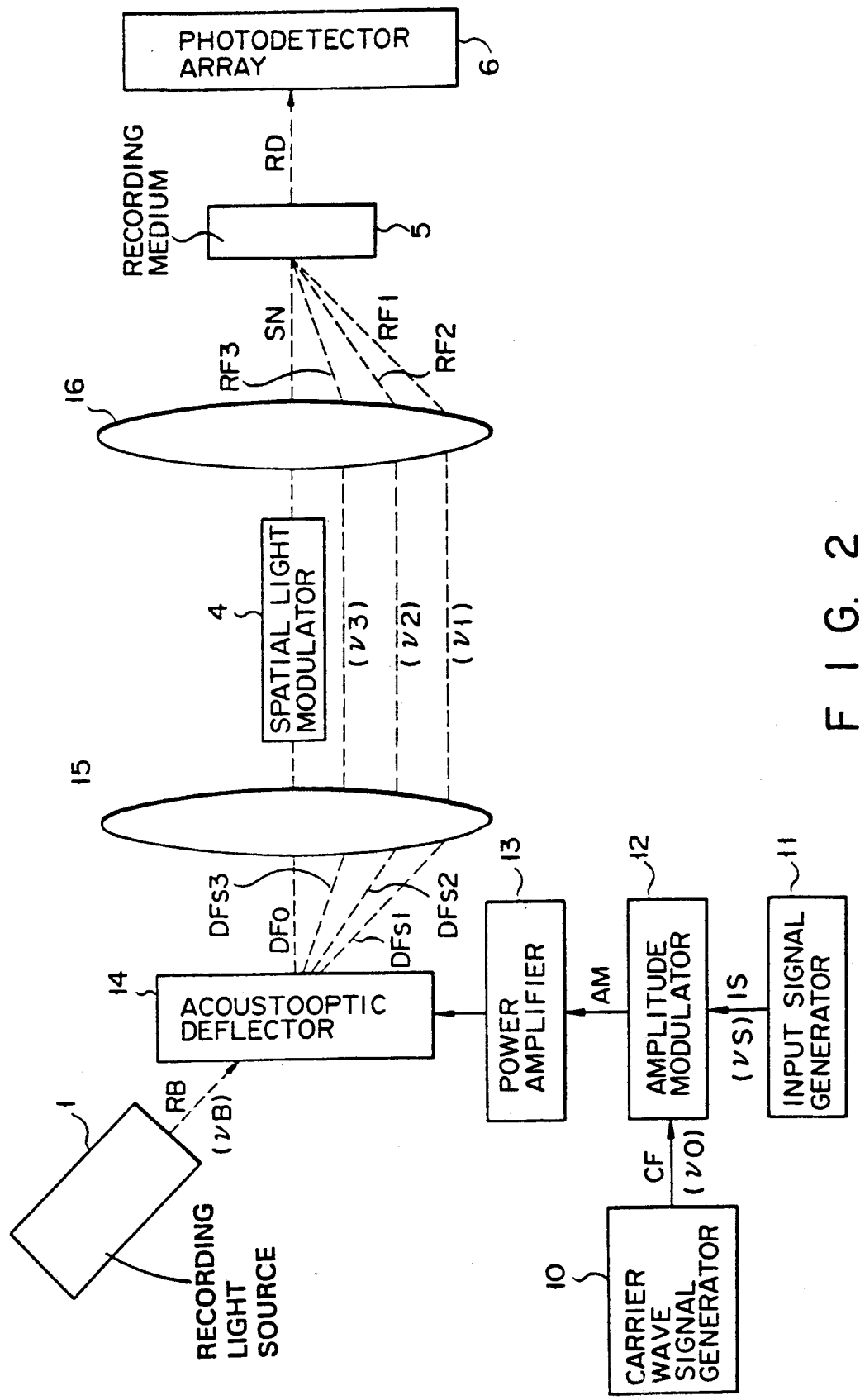
FIG. 2 is a block diagram for explaining a multiplexed recording operation in the arrangement shown in FIG. 1.

FIG. 2 shows an arrangement in which high-speed multiplexed recording can be performed by setting the angles of incidence of reference beams $RF_1$, $RF_2$, and $RF_3$ on the recording medium 5 to be different from each other.

In practice, the angles of incidence of the reference beams RF can be changed by switching the frequency of the amplitude modulation input signal IS from the input signal generator 11.

In such a recording system, multiplexed recording can be performed by using a recording medium serving as a volume hologram capable of multiplexed recording by utilizing the differences in angle of incidence between the reference beams RF.

Note that the same reference numerals in the block diagram of FIG. 2 denote the same parts as in the block of FIG. 1, and a description of its arrangement will be omitted.

For example, a dielectric material such as $Bi_{12}SiO_{20}$ (BSO), $Sr_xBa_{1-x}Nb_2O_6$ (SBN), or $LiNbO_3$, or a semiconductor such as GaP or GaAs can be used as a medium for such a volume hologram.

In addition, since switching of the frequency of the amplitude modulation input signal IS can be electrically controlled, high-speed multiplexed recording can be easily realized.

An information recording apparatus according to another embodiment of the present invention will be described next with reference to FIGS. 3 and 4. Note that the same reference numerals in FIG. 3 denote the same parts as in FIGS. 1 and 2, and a description of their arrangements will be omitted.

Figure 3:
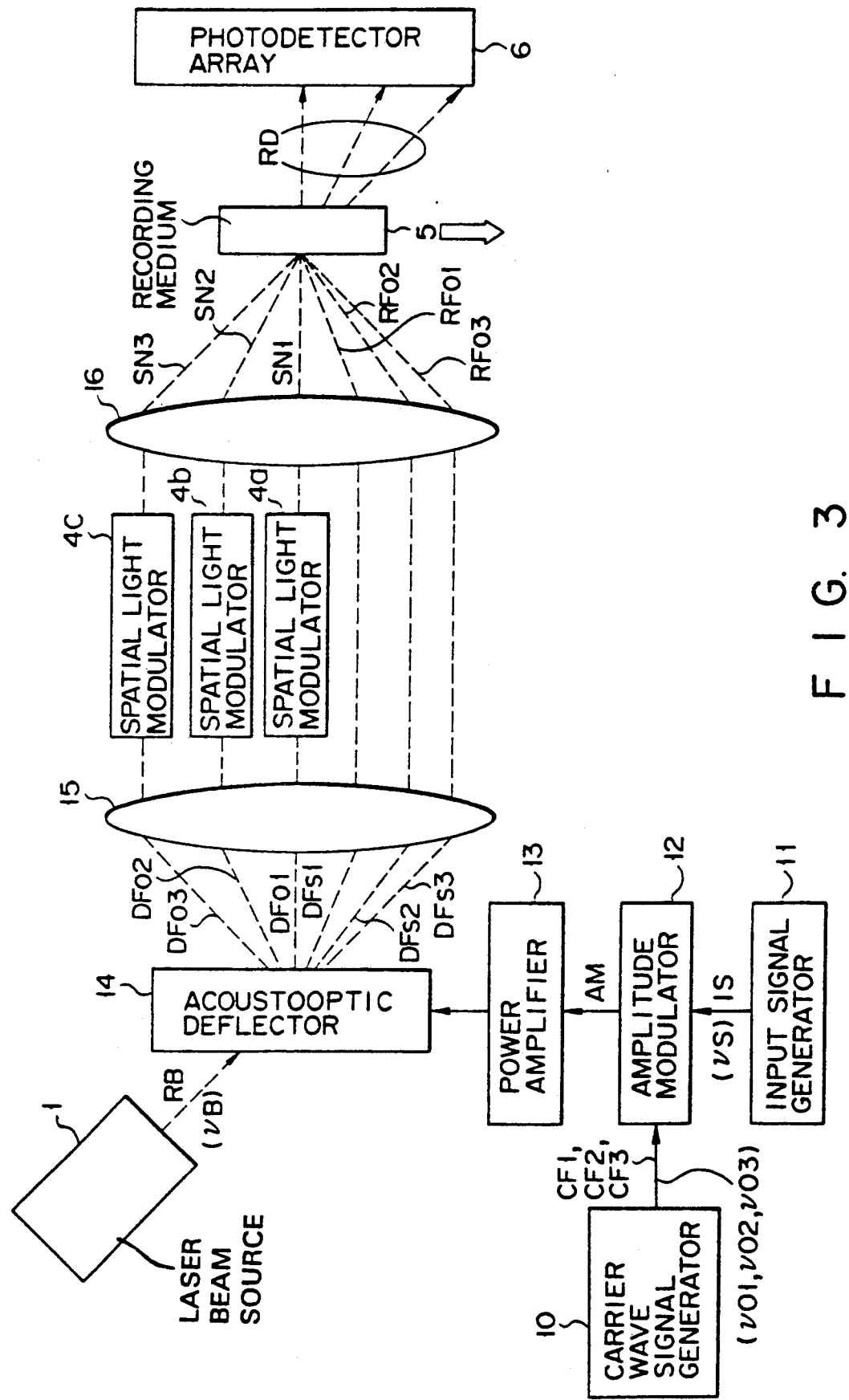
FIG. 3 is a block diagram showing an apparatus for performing a high-speed multiplexed recording operation performed by using a plurality of diffracted beam modulating means according to another embodiment of the present invention.

In the embodiment shown in FIG. 3, a plurality of signal beams are obtained from a plurality of carrier wave diffracted beams $DF_{01}$, $DF_{02}$, and $DF_{03}$, generated by an acoustooptic deflector 14 driven by carrier waves having different frequencies $v_{01}$, $v_{02}$, and $v_{03}$, through spatial light modulators 4a, 4b, and 4c, and these signal beams are radiated on the surface of a recording medium 5. The respective signal beams and corresponding reference beams $RF_{01}$, $RF_{02}$, and $RF_{03}$ are incident at predetermined positions on the recording medium 5 to sequentially record interference fringes, thus enabling high-density recording. This embodiment will be described below.

The spatial light modulators 4a, 4b, and 4c respectively modulate the carrier wave diffracted beams $DF_{01}$, $DF_{02}$, and $DF_{03}$ (to be described later) to provide different two-dimensional information therefor, and output them as signal beams $SN_1$, $SN_2$, and $SN_3$. The bit pattern formation time of each of the spatial light modulators 4a, 4b, and 4c is represented by Ts, and the bit pattern switching time of the information recording apparatus of this embodiment is represented by Ta, as shown in FIG. 4. In this case, Ta < Ts. Since each of the spatial lightmodulators 4a, 4b, and 4c completes the formation of a corresponding bit pattern substantially in the time Ts after it is started, the spatial light modulators 4a, 4b, and 4c are sequentially started with the delay times Ta.

The recording medium 5 is arranged to be moved by a moving mechanism (not shown) in the vertical direction indicated by an arrow in FIG. 3. Upon incidence of signal beams $SN_1$, $SN_2$, and $SN_3$ and the corresponding reference beams $RF_{01}$, $RF_{02}$, and $RF_{03}$, information is recorded, as a hologram, on the recording medium 5. Reference numeral 6 denotes a photodetector array for detecting a reconstructed beam RD in reproduction of recorded information.

Figure 4:
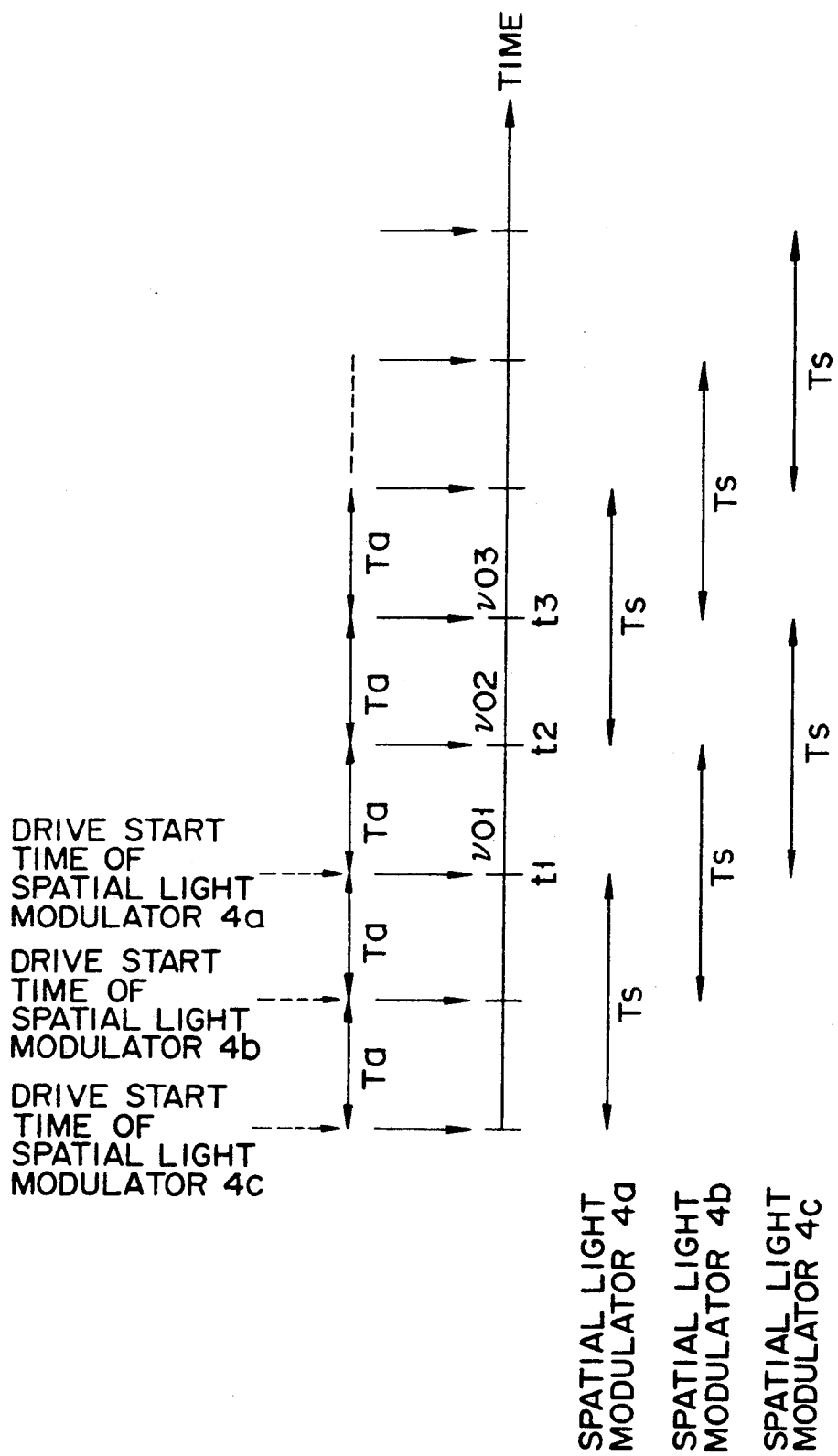
FIG. 4 is a timing chart showing a relationship between the bit pattern formation times of the plurality of diffracted beam modulating means and the switching timings of amplitude-modulated frequencies with respect to acoustooptic deflecting means, in the embodiment shown in FIG. 3.

Reference numeral 10 denotes a carrier wave generator for sequentially generating carrier waves $CF_1$, $CF_2$, and $CF_3$ respectively having frequencies $v_{01}$, $v_{02}$, and $v_{03}$ at intervals of the apply time Ta, as shown in FIG. 4.

Reference numeral 11 denotes an input signal generator for generating an amplitude modulation input signal IS having a frequency $v_S$.

Reference numeral 12 denotes an amplitude modulator for modulating the amplitudes of the respective carrier waves $CF_1$, $CF_2$, and $CF_3$ with the input signal IS. Upon this amplitude modulation, frequency components $v_{01(02,03)}$, $v_{01(02,03)} - v_S$ (lower sideband), and $v_{01(02,03)} + v_S$ (upper sideband) are generated. The amplitude modulator 12 removes, e.g., the upper sideband of these frequency components by using a low-pass filter (not shown) and outputs an amplitude-modulated signal AM having the frequency components $v_{01(02,03)}$ and $v_{01(02,03)} - v_S$.

Reference numeral 14 denotes an acoustooptic deflector driven by the amplitude-modulated signal AM from the amplitude modulator 12. Upon incidence of a light beam RB having an optical frequency $v_B$ from a recording light source 1, the acoustooptic deflector 14 outputs deffracted beams $DF_{01(02,03)}$ and $DF_{S1(S2,S3)}$, having frequencies respectively Doppler-shifted from the frequency $v_B$ by amounts corresponding to $v_{01(02,03)}$ and $v_{01(02,03)} - v_S$, at different angles of diffraction.

Reference numeral 15 denotes a collimator lens for collimating the diffracted beams $DF_{01(02,03)}$ and $DF_{S1(S2,S3)}$ from the acoustooptic deflector 14 and causing the diffracted beams $DF_{01}$, $DF_{02}$, and $DF_{03}$ to be respectively incident on the spatial light modulators 4a, 4b, and 4c.

Reference numeral 16 denotes an objective lens for focusing the signal beams $SN_1$, $SN_2$, and $SN_3$ from the spatial light modulators 4a, 4b, and 4c to cause them to be incident on the recording medium 5, and for focusing the diffracted beams $DF_{S1(S2,S3)}$ to cause them to be respectively incident, as the reference beams $RF_{O1}$, $RF_{O2}$, and $RF_{O3}$, on the same incident region as the signal beams $SN_1$, $SN_2$, and $SN_3$ on the recording medium 5.

FIG. 4 is a timing chart showing a relationship between the driving time of each of the spatial light modulators 4a, 4b, and 4c in the recording mode, i.e., the bit pattern formation time, and the apply time of amplitude-modulated signals, i.e., the frequency switching time of the carrier wave generator 10.

Referring to FIG. 4, reference symbol Ts denotes a bit pattern switching time; Ta, a fixed amplitude modulation apply time; and $t_1, t_2, t_3, \ldots$, timings of incidence of the diffracted beams $DF_{O1}$, $DF_{O2}$, and $DF_{O3}$ on the spatial light modulators 4a, 4b, and 4c.

In this embodiment, as shown in FIG. 4, the spatial light modulators 4a, 4b, and 4c are sequentially driven. At the timing $t_1$ when the formation of a bit pattern is completed by the spatial light modulator 4a, the diffracted beam $DF_{O1}$ corresponding to a carrier wave obtained by performing amplitude modulation of the carrier frequency $v_{O1}$ from the amplitude modulator 12 with the modulation frequency $v_S$ is radiated on the spatial light modulator 4a. At the timing $t_2$ when the formation of a bit pattern is completed by the spatial light modulator 4b, the diffracted beam $DF_{O2}$ corresponding to a carrier wave obtained by performing amplitude modulation of the carrier frequency $v_{O2}$ with the modulation frequency $v_S$ is radiated on the spatial light modulator 4b. At the timing $t_3$ when the formation of a bit pattern is completed by the spatial light modulator 4c, the diffracted beam $DF_{O3}$ corresponding to a carrier wave obtained by performing amplitude modulation of the carrier frequency $v_{O3}$ with the modulation frequency $v_S$ is radiated on the spatial light modulator 4c. Subsequently, similar operations are repeated to record holograms on a moving recording medium at intervals of the time Ta shorter than the bit pattern formation time Ts.

An information recording operation in the above-described arrangement will be described next.

The respective spatial light modulators 4a, 4b, and 4c are sequentially started with the delay times Ta. The formation of a bit pattern is completed when the time Ts elapses after each of the spatial light modulators 4a, 4b, and 4c is started.

The carrier waves $CF_1$, $CF_2$, and $CF_3$ having the frequencies $v_{O1(O2,O3)}$ generated by the carrier wave generator 10 and the input signal IS having the frequency $v_S$ generated by the input signal generator 11 are input to the amplitude modulator 12.

In the amplitude modulator 12, the carrier wave CFI is amplitude-modulated first with the input signal IS. As a result, the frequency components $v_{O1}$, $v_{O1} - v_S$ (lower sideband), and $v_{O1} + v_S$ (upper sideband) are generated. Of the generated frequency components, the upper sideband is removed by the low-pass filter (not shown), and the amplitude-modulated signal AM having the frequency components $v_1$ and $v_{O1} - v_S$ is output. The signal AM is then input to the acoustooptic deflector 14.

At the same time, the light beam RB having the optical frequency $v_B$ from the recording light source 1 is incident on the acoustooptic deflector 14. As a result, the diffracted beams $DF_{O1}$ and $DF_{S1}$ having frequencies respectively Doppler-shifted from the frequency $v_B$ by amounts corresponding to $v_1$ and $v_{O1} - v_S$ are generated.

These diffracted beams $DF_{O1}$ and $DF_{S1}$ are collimated by the collimator lens 15, and the diffracted beam $DF_{O1}$ is incident on the spatial light modulator 4a at the timing $t_1$ when the time Ts elapses after the spatial light modulator 4a is started. The diffracted beam $DF_{O1}$ is provided with predetermined two-dimensional information by the spatial light modulator 4a and is output as the signal beam $SN_1$.

The signal beam $SN_1$ is focused by the objective lens 16 to be incident at a predetermined position on the recording medium 5. Meanwhile, the diffracted beam $DF_{S1}$ collimated by the collimator lens 15 is focused by the objective lens 16 to be incident, as the reference beam $RF_{O1}$, on the incident region of the signal beam $SN_1$ on the recording medium 5. With this operation, the signal beam $SN_1$ and the reference beam $RF_{O1}$ interfere with each other on the surface of the recording medium 5 to record interference fringes.

The frequency $v_{O1}$ of the carrier wave generator 10 is switched to the frequency $v_{O2}$ at the timing $t_2$ when the time Ts elapses from the start of driving of the spatial light modulator 4b after the time Ta elapses from the driving start time of the spatial light modulator 4a.

With this operation, the carrier wave $CF_2$ having the frequency $v_{O2}$ is amplitude-modulated with the input signal IS having the frequency $v_S$ in the amplitude modulator 12. As a result, the amplitude-modulated signal AM having the frequency components $v_{O2}$ and $v_{O2} - v_S$ are output from the amplitude modulator 12 according to the same operation principle as described above. The signal AM is then input to the acoustooptic deflector 14.

With this operation, the acoustooptic deflector 14 generates the diffracted beams $DF_{O2}$ and $DF_{S2}$ having frequencies respectively Doppler-shifted from the optical frequency $v_B$ of the incident light beam RB from recording light source 1 by amounts corresponding to $v_{O2}$ and $v_{O2} - v_S$. The angle of diffraction of the diffracted beam $DF_{O2}$ is different from that of the diffracted beam $DF_{O1}$.

beam $DF_{O2}$ is collimated by the collimator lens 15 and is incident on the spatial light modulator 4b. The diffracted beam $DF_{O2}$ is provided with predetermined two-dimensional information by the spatial light modulator 4b and is output as the signal beam $SN_2$.

At this time, the reference beam $RF_{O2}$, based on the lower sideband diffracted beam $DF_{S2}$, and the signal beam $SN_2$ are focused by the objective lens 16 to be incident at a predetermined position on the recording medium 5, thus recording interference fringes generated by the two beams.

The frequency $v_{O2}$ of the carrier wave generator 10 is then switched to the frequency $v_{O3}$ at the timing $t_3$ when the time Ts elapses from the start of driving of the spatial light modulator 4c after the time Ta elapses from the driving start time of the spatial light modulator 4b.

With this operation, in the amplitude modulator 12, the carrier wave $CF_3$ having the frequency $v_{O3}$ is amplitude-modulated with the input signal IS having the frequency $v_S$. As a result, the amplitude-modulated signal AM having the frequency components $v_{O3}$ and $v_{O3} - v_S$ is output from the amplitude modulator 12 according to the same operation principle as described above. The signal AM is then input to the acoustooptic deflector 14.

With this operation, the acoustooptic deflector 14 generates the diffracted beams $DF_{O3}$ and $DF_{S3}$ having the frequencies respectively Doppler-shifted from the optical frequency $\nu_B$ of the incident light beam RB from the recording light source 1 by amounts corresponding to $\nu_{03}$ and $\nu_{03}-\nu_S$. The angle of diffraction of this diffracted beam $DF_{03}$ is different from that of each of the abovementioned diffracted beams $DF_{01}$ and $DF_{02}$.

The diffracted beam $DF_{03}$ is collimated by the collimator lens 15 and is incident on the spatial light modulator 4c. The diffracted beam $DF_{03}$ is provided with predetermined two-dimensional information by the spatial light modulator 4c and is output as the signal beam $SN_3$.

At this time, the reference beam $RF_{03}$, based on the lower sidewave diffracted beam $DF_{S3}$, and the signal beam $SN_3$ are focused by the objective lens 16 to be incident on a predetermined position on the recording medium 5. As a result, interference fringes generated by the two beams are recorded.

The above-described operation is repeated to perform holographic recording of the two-dimensional information on the recording medium 5.

Note that if a volume hologram capable of multiplexed recording is applied to such a recording system, multiplexed recording can be performed.

As a medium on which such a volume hologram can be recorded, for example, a dielectric material such as $Bi_{12}SiO_{20}$ (BSO), $Sr_xBa_{1-x}Nb_2)_6$ (SBN), or $LiNbO_3$, or a semiconductor such as GaP or GaAs can be used.

As described above, according to this embodiment, the angles of diffraction of diffracted beams are changed by changing the carrier waves $CF_1$, $CF_2$, and $CF_3$ thus selecting the spatial light modulators 4a, 4b, and 4c. With this operation, the respective diffracted beams $DF_{01}$, $DF_{02}$, and $DF_{03}$ are respectively provided with different information through the spatial light modulators 4a, 4b, and 4c, and the resulting signals are used as the signal beams $SN_1$, $SN_2$, and $SN_3$. Therefore, two-dimensional information can be recorded, as holograms, on the moving recording medium 5 at high speed.

In this embodiment, modulation frequency switching for changing the angles of diffractions of diffracted beams as signal beams is performed by switching the frequencies of the carrier waves $CF_1$, $CF_2$, and $CF_3$. The present invention, however, is not limited to this. The same effect as described above can be obtained by switching the frequency of the amplitude modulation input signal $\nu_S$ instead of switching the frequencies of the carrier waves $CF_1$, $CF_2$, and $CF_3$.

More specifically, diffracted beams corresponding to the amplitude modulation input signal IS and a carrier wave are respectively used as a signal beam and a reference beam, and the frequency of the amplitude modulation input signal IS is switched at high speed, thereby changing the angle of diffraction of the signal beam.

Furthermore, in this embodiment, one of upper and lower sidebands (the upper sideband in this embodiment) generated by the amplitude modulator 12 is removed by the filter (not shown). However, the present invention is not limited to this. Instead of performing a removing operation in the amplitude modulator 12, such an operation may be performed by the acoustooptic deflector 14 itself by shifting the frequency $\nu_0$ of the carrier wave CF from the center frequency of the acoustooptic deflector 14 so as to set one of the upper and lower sidebands to fall outside the deflection bandwidth of the acoustooptic deflector 14.

Moreover, it is apparent that the number of frequencies to be switched and the number of corresponding spatial light modulator are not limited to those in the embodiment described above.

An information recording apparatus according to still another embodiment of the present invention will be described with reference to FIG. 5.

In this embodiment, a plurality of laser beams having different wavelengths are simultaneously or sequentially radiated on an acoustooptic deflector to obtain diffracted beams in directions corresponding to the wavelengths of the respective laser beams, thus changing the angles of incidence of reference and signal beams incident on a recording medium. With this operation, interference between the reference and signal beams is caused on the surface of the moving recording medium to obtain interference fringes, thereby performing high-speed multiplexed recording.

Figure 5:
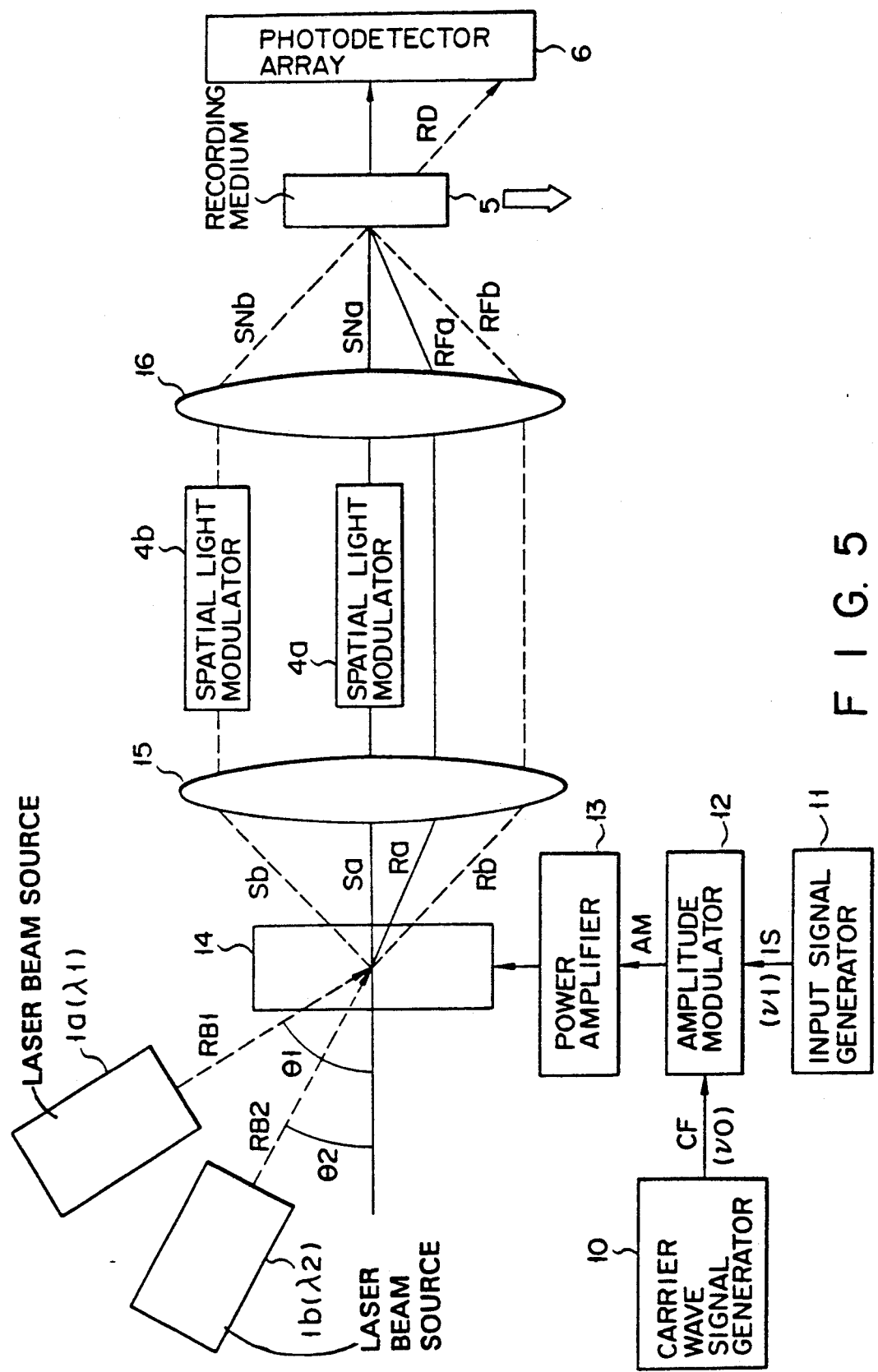
FIG. 5 is a block diagram showing an apparatus for simultaneously or sequentially receiving a plurality of laser beams having different wavelengths and performing multiplexed recording operations at the same timing by using the pair of the signal and reference beams obtained upon incidence of the respective laser beams according to still another embodiment of the present invention.

Referring to FIG. 5, reference numerals 1a and 1b denote laser beam sources having wavelengths $\lambda 1$ and $\lambda 2$, each of which is constituted by, e.g., an argon laser or an Nd:YAG laser; and 14, an acoustooptic deflector. When the acoustooptic deflector 14 is driven by an amplitude-modulated signal AM generated by an amplitude modulator 12 (to be described later), it generates a supersonic wave corresponding to the signal AM. At this time, if a laser beam RB1 having the wavelength $\lambda 1$ from the laser beam source 1a is incident on the wavefront of this supersonic wave at a Bragg angle $\theta 1$, two diffracted beams Ra and Sa corresponding to frequency components $\nu 1$ and $\nu 0 - \nu 1$ are output at specific angles of diffraction. Similarly, if a laser beam RB2 having the wavelength $\lambda 2$ from the laser beam source 1b is incident on the wavefront of the supersonic wave at a Bragg angle $\theta 2$, two diffracted beams Rb and Sb are output at angles of diffraction different from those in the case of the wavelength $\lambda 1$.

Reference numeral 12 denotes an amplitude modulator for performing amplitude modulation of a carrier wave CF with an amplitude modulation input signal IS to generate frequency components $\nu 0$, $\nu 0 - \nu 1$ (lower sideband), and $\nu_0 + \nu_1$ (upper sideband), and removing, e.g., the upper sideband of the generated frequency components by using a low-pass filter (not shown) to output an amplitude-modulated signal AM having the frequency components $\nu 0$ and $\nu 0 - \nu 1$. Reference numeral 11 denotes an input signal generator for generating an amplitude modulation input signal IS having a frequency $\nu 1$ different from the frequency $\nu 0$; and 10, a carrier wave generator for generating the carrier wave CF having the frequency $\nu 0$.

Reference numeral 15 denotes a collimator lens for collimating diffracted beams from the acoustooptic deflector 14 and for causing two carrier wave diffracted beams Sa and Sb from the acoustooptic deflector 14 to be incident on spatial light modulators 4a and 4b, respectively. These spatial light modulators 4a and 4b modulate the two carrier wave diffracted beams Sa and Sb to provide different two-dimensional information there for and output the resulting beams as signal beams SN.

Reference numeral 16 denotes an objective lens for focusing signal beams SNa and SNb generated by the spatial light modulators 4a and 4b to radiate them on a recording medium 5 moving in a predetermined direction, and for focusing the lower sideband diffracted beams Ra and Rb through the collimator lens 15 to radiate them on the incident region of the signal beams on the recording medium 5. Note that the recording medium 5 is arranged to be moved by a moving mechanism (not shown) in the vertical direction indicated by an arrow in FIG. 5. Reference numeral 6 denotes a photodetector array for detecting a reconstructed beam RD in reproduction of recorded information.

An information recording operation of this embodiment having the above-described arrangement will be described below.

The carrier wave CF having the frequency $\nu 0$, generated by the carrier wave generator 10, and the input signal IS having the frequency $\nu 1$, generated by the input signal generator 11, are input to the amplitude modulator 12. The amplitude modulator 12 performs amplitude modulation of the carrier wave CF with the input signal IS. As a result, the frequency components $\nu 0$, $\nu 0 - \nu 1$ (lower sideband), and $\nu 0 + \nu 1$ (upper sideband) are generated. Of the generated frequency components, the upper sideband is removed by the low-pass filter (not shown), and the amplitude-modulated signal AM having the frequency components $\nu 0$ and $\nu 0 - \nu 1$ is output. The signal AM is input to the acoustooptic deflector 14. The acoustooptic deflector 14 then generates a supersonic wave corresponding to the amplitude-modulated signal AM. The wavelength of this supersonic wave is represented by $\Lambda$.

At the same, the laser beam RB1 having the wavelength $\lambda 1$ from the laser beam source 1a is incident on the acoustooptic deflector 14 at the angle $\theta 1$ of incidence satisfying the following Bragg diffraction condition with respect to the wavefront of a supersonic wave:

$$2\Lambda 0 \text{ A}\sin \theta = \lambda 1 \qquad (14)$$

As a result, the diffracted beams Sa and Ra respectively corresponding to the carrier wave CF and the lower sideband signal $\nu 0 - \nu 1$ are output.

These two diffracted beams Sa and Ra are collimated by the collimator lens 15. The diffracted beam Sa is incident on the spatial light modulator 4a to be provided with two-dimensional information and is output as the signal beam SNa. The signal beam SNa is focused by the objective lens 16 to be incident at a predetermined position on the moving recording medium 5. Meanwhile, the diffracted beam Ra collimated by the collimator lens 15 is focused by the objective lens 16 to be incident, as a reference beam RFa, on the incident region of the signal beam SNa on the recording medium 5 at an angle $\theta 1$ of incidence determined by the frequency $\nu 1$ of the input signal IS and the wavelength $\lambda 1$ of the incident laser beam RB1. As a result, the signal beam SNa and the reference beam RFa interfere with each other on the moving recording medium 5, thus recording interference fringes generated by the two beams.

When the laser beam RB2 having the wavelength $\lambda 2$ from the laser beam source 1b is incident on the acoustooptic deflector 14 at an angle $\theta 2$ of incidence satisfying the following Bragg diffraction condition with respect to the wavefront of a supersonic wave:

$$2\Lambda \sin \theta 2 = \lambda 2 \qquad , (15)$$

at the same time when the laser beam RB1 is output, the acoustooptic deflector 14 outputs the diffracted beams Sb and Rb respectively corresponding to the carrier wave CF and the lower sideband at angles of diffractions different from those in the case of the laser beam RB1.

The diffracted beam Sb is collimated by the collimator lens 15 and is incident on the spatial light modulator 4b to be provided with two-dimensional information different from that provided by the spatial light modulator 4a. The resulting beam is output as the signal beam SNb. The signal beam SNb is focused by the objective lens 16 to be incident on the same region as the incident region of the signal and reference beams SNa and RFa. The diffracted beam Rb is collimated by the collimator lens 15 and is focused by the objective lens 16 to be incident, as a reference beam RFb, on the incident region of the signal beam SNb on the recording medium 5 at an angle $\Theta 2$ of incidence determined by the frequency $\nu 1$ of the input signal IS and the wavelength $\lambda 2$ of the incident laser beam RB2. With this operation, the signal beam SNb and the reference beam RFb interfere with each other on the moving recording medium 5, thus recording interference fringes generated by the two beams. At this time, since laser beams emitted from different laser beam sources are incoherent, the two pairs of the signal and reference beams SNa and RFb, and SNb and RFa generate no interference fringes. In addition since the wavelengths $\lambda 1$ and $\lambda 2$ are different from each other, the angles $\Theta 1$ and $\Theta 2$ of incidence are also different from each other.

As a recording medium capable of multiplexed recording. for example, a dielectric material such as $Bi_{12}SiO_{20}$ (BSO), $Sr_xBa_{1-x}Nb_2O_6$ (SBN), or $LiNbO_3$, or a semiconductor such as GaP or GaAs can be used.

According to the above-described embodiment, the laser beams RB1 and RB2 having different wavelengths are simultaneously radiated on the acoustooptic deflector 14 driven at a predetermined driving frequency to obtain two pairs of diffracted beams with respect to the incident laser beams RB1 and RB2. By using the obtained beams as signal and reference beams, multiplexed recording of two-dimensional digital information can be performed on the moving recording medium 5 at once, and the multiplicity is not limited by the frequency band. of the acoustooptic deflector 14, in which amplitude modulation can be performed, and by the numerical aperture (NA) of the objective lens 16. In addition, no time is required to switch the reference beams RF, and the storage rate is not greatly limited. Note that in the above embodiment, laser beams need not be emitted by a plurality of laser beam sources at the same time, but may be selectively and sequentially emitted to record-/superpose holograms on a pre-recorded hologram.

An information recording apparatus according to still another embodiment of the present invention will be described below with reference to FIGS. 6 to 8.

In this embodiment, the angles of incidence of signal and reference beams, as diffracted beams from an acoustooptic deflector, on a recording medium can be controlled in accordance with the inclination of the recording medium so that multiplexed recording on the moving medium can be performed while the angular resolution in multiplexed recording is not limited by, e.g., the axial runout and warpage of the medium.

Referring to FIG. 6, reference numeral 1 denotes a recording light source constituted by, e.g., an argon laser or an Nd:YAG laser; and 14, an acoustooptic deflector which is driven by an amplitude-modulated signal AM generated by an amplitude modulator 12 (to be described later) to generate a supersonic wave corresponding to the signal AM. At this time, if a laser beam RB having a wavelength $\lambda$ from the recording light source 1 is incident on the acoustooptic deflector 14, two diffracted beams corresponding to frequency components $\nu 0$ ($\pm\Delta\nu$) and $\nu 0-\nu i$ ($\pm\Delta\nu$) are output at specific angles of diffraction.

The amplitude modulator 12 performs amplitude modulation of a carrier wave CF with an amplitude modulation input signal IS to generate frequency components $\nu 0-\nu i\pm\Delta\nu$ (lower sideband), and $\nu 0+\nu i\pm\Delta\nu$ (upper sideband), and removes, e.g., the upper sideband by using a low-pass filter (not shown), thereby outputting an amplitudemodulated signal AM having the frequency components $\nu 0\pm\Delta\nu$ and $\nu 0-\nu i\pm\Delta\nu$.

Reference numeral 15 denotes a collimator lens for collimating diffracted beams from the acoustooptic deflector 14 and causing one of the diffracted beams to be incident on a spatial light modulator 4. The spatial light modulator 4 modulates carrier wave diffracted beams to provide two-dimensional information therefor, and outputs them as signal beams SNa and SNb.

Reference numeral 16 denotes an objective lens for focusing the signal beams SNa and SNb formed by the spatial light modulator 4 to radiate the beams on a recording medium 5 moving in a predetermined direction, and for focusing the other diffracted beam through the collimator lens 15 to radiate it on the incident region of the signal beams on the recording medium 5. Note that the recording medium 5 is arranged to be moved by a moving mechanism (not shown).

Reference numeral 10 denotes a carrier wave generator for generating the carrier wave CF having the frequency $\nu 0\pm\Delta\nu$ corresponding to the input level of an inclination detection signal PDout (to be described later). More specifically, when the recording medium 5 is not inclined but in a horizontal state as a reference state, and the inclination detection signal PDout is at a reference level, the generator 10 generates the carrier wave CF having the reference frequency $\nu 0$. In contrast to this, when the recording medium 5 is inclined, and the level of the inclination detection signal PDout varies, the generator 10 generates the carrier wave CF having the frequency $\nu 0\pm\Delta\nu$ obtained by shifting the reference frequency $\nu 0$ by an amount corresponding to $\pm\Delta\nu$ in accordance with the variation in level.

Reference numeral 11 denotes an input signal generator for generating the input signal IS having a frequency $\nu i(\neq\nu 0)\pm\Delta\nu$ corresponding to the input level of the inclination detection signal PDout (to be described later). More specifically, similar to the carrier wave generator 10, the input signal generator 11 generates the input signal IS having a reference frequency $\nu i$ when the recording medium 5 is not inclined but is in a horizontal state as a reference state, and the inclination detection signal PDout is at a reference level. When the recording medium 5 is inclined, and the level of the inclination detection signal PDout varies, the input signal generator 11 generates the input signal IS having a frequency $\nu i\pm\Delta\nu$ obtained by shifting the reference frequency $\nu i$ by an amount corresponding to $\pm\Delta\nu$ in accordance with the variation in level.

Figure 7:
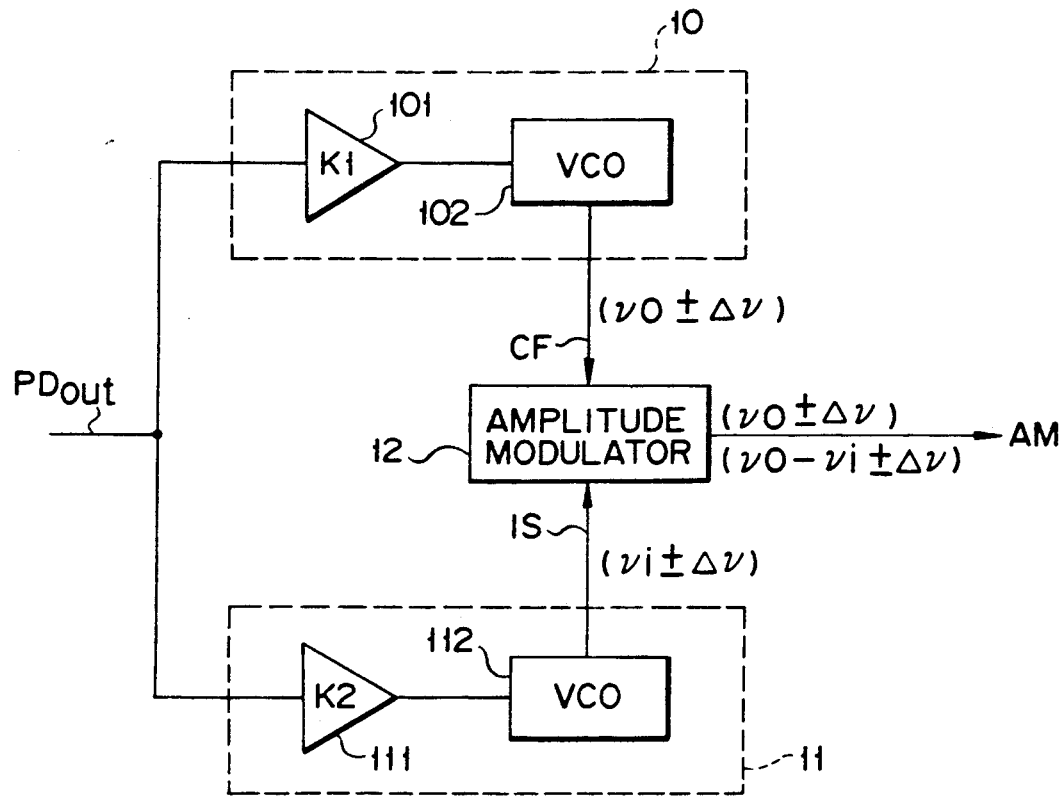
FIG. 7 is a block diagram showing arrangements of a carrier wave generator and an input signal generator in the embodiment shown in FIG. 6.

The carrier wave generator 10 is constituted by an amplifier 101 having an amplification factor k1, and a voltage-controlled oscillator 102, as shown in FIG. 7. The input signal generator 11 is constituted by an amplifier 111 having an amplification factor k2, and a voltage-controlled oscillator 112. The respective amplifiers 101 and 111 receive the inclination detection signal PDout and change the oscillation frequencies of the voltage-controlled oscillators 102 and 112 in accordance with the input level of the PDout. Thereafter, the resulting signals are input to the amplitude modulator 12.

Referring to FIG. 6, reference numeral 20 denotes an inclination detecting laser beam source for radiating a laser beam L1 onto a predetermined position on a lower surface 51 of the recording medium 5 at a predetermined angle.

Reference numeral 21 denotes a focusing lens for focusing a reflected beam LR of the laser beam L1 from the lower surface 51 of the recording medium 5.

Reference numeral 22 denotes a position detecting photodetector constituted by, e.g., a photosensitive detector. When the reflected beam LR from the lower surface 51 of the recording medium 5 is incident at a reference position PB, an output equivalent to a preset reference output is obtained by the photodetector 22. If the incident position of the reflected beam LR is deviated from the reference position PB, the photodetector 22 obtains an output having a difference corresponding to the deviation with respect to the reference output.

Reference numeral 23 denotes a differential amplifier for receiving two outputs from the photodetector 22, amplifying the difference therebetween, and outputting the amplified difference as the inclination detection signal PDout to the carrier wave generator 10 and the input signal generator 11.

An operation to be performed when the recording medium 5 is inclined from the horizontal state will be described below.

Figure 8:
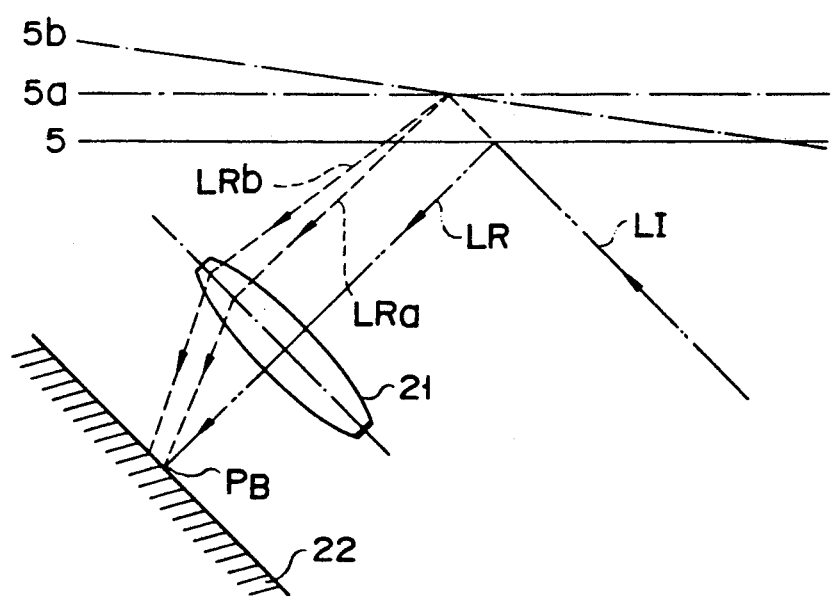
FIG. 8 is a view for explaining a detecting operation of the inclination of a recording medium in the embodiment shown in FIG. 6.

As shown in FIG. 8, when the recording medium 5 is at a reference position indicated by a solid line and its recording surface is kept horizontal in the transverse direction on the drawing, or the recording medium 5 is translated upward, as indicated by reference numeral 5a, and the recording surface of the recording medium 5a is kept in a horizontal state, the beam L1 from the laser beam source 20 is reflected by the lower surface 51 of the recording medium 5, and the reflected beam LR or LRa is caused to be incident at the reference position PB of the position detecting photodetector 22 by the focusing lens 21. As a result, the two outputs from the position detecting photodetector 22 are output at the same level and are input to the differential amplifier 23. Therefore, the inclination detection signal PDout output from the differential amplifier 23 is set at "0" level.

Since the level of the inclination detection signal PDout is zero, the carrier wave CF having the reference frequency $\nu 0$ is generated by the carrier wave generator 10 and is output to the amplitude modulator 12. Similarly, the input signal IS having the reference frequency $\nu i$ is generated by the input signal generator 11 and is output to the amplitude modulator 12.

The amplitude modulator 12 performs amplitude modulation of the carrier wave CF with the input signal IS As a result, frequency components $\nu 0$, $\nu 0-\nu i$ (lower sideband), and $\nu 0+\nu i$ (upper sideband) are generated. Of the generated frequency components, the upper sideband is removed by the low-pass filter (not shown), and the amplitude-modulated signal AM having the frequency components $\nu 0$ and $\nu 0-\nu i$ is output. This signal AM is input to the acoustooptic deflector 14. The acoustooptic deflector 14 generates a supersonic wave corresponding to the amplitude-modulated signal AM.

Meanwhile, the laser beam LB having the wavelength $\lambda$ from the recording light source 1 is incident on the acoustooptic deflector 14. As a result, diffracted beams S and R respectively corresponding to the carrier wave CF and the lower sideband signal are output from the acoustooptic deflector 14 at different angles of diffraction.

The diffracted beam S is incident on the spatial light modulator 4 to be provided with two-dimensional information, and the resulting beam is output as a signal beam SN. The signal beam SN is focused by the objective lens 16 to be incident at a predetermined position on the moving recording medium 5. In addition, the diffracted beam R collimated by the collimator lens 15 is focused by the objective lens 16 to be incident, as a reference beam RF, on the incident region of the signal beam SN on the recording medium 5 at an angle of incidence determined by the frequency $vi$ of the input signal IS and the wavelength $\lambda$ of the laser beam LB. With this operation, the signal beam SN and the reference beam RF interfere with each other on the surface of the moving recording medium 5, thus recording interference fringes generated by the two beams.

In contrast to this, as indicated by reference numeral $5b$ in FIG. 8, if the recording medium $5b$ is translated upward and its recording surface is inclined from the horizontal state, a reflected beam LRb of the laser beam L1, from the laser beam source 20, which is reflected by the lower surface 51 of the recording medium 5 is caused to be incident at a position deviated from the reference position PB on the position detecting photodetector 22 by a distance corresponding to the inclination. As a result, two outputs from the position detecting photodetector 22 are output at different levels and are input to the differential amplifier 23. Therefore, the inclination detection signal PDout output from the differential amplifier 23 is not set at "0" level but is set at a level corresponding to the inclination.

The inclination detection signal PDout having a predetermined level is input to the carrier wave generator 10 and the input signal generator 11. The carrier wave generator 10 generates the carrier wave CF having a frequency $v0 \pm \Delta v$ obtained by shifting the reference frequency $v0$ by $\pm \Delta v$ in accordance with the input level of the inclination detection signal PDout. The carrier wave CF is output to the amplitude modulator 12. Similarly, the input signal generator 11 generates the input signal IS having a frequency $v0 \pm \Delta v$ obtained by shifting the reference frequency $vi$ by $\pm \Delta v$. The input signal IS is also output to the amplitude modulator 12.

As described above, the amplitude modulator 12 performs amplitude modulation of the carrier wave CF with the input signal IS. As a result, frequency components $v0 \pm \Delta v$, $v0 - vi \pm \Delta v$ (lower sideband), and $v0 + vi \pm \Delta v$ (upper sideband) are generated. Of the generated frequency components, the upper sideband is removed by the lowpass filter (not shown), and the amplitude-modulated signal AM having the frequency components $v0 \pm \Delta v$ and $v0 - vi \pm \Delta v$ is output. The signal AM is input to the acoustooptic deflector 14. The acoustooptic deflector 14 generates a supersonic wave corresponding to the amplitude-modulated signal AM. Meanwhile, the laser beam having the wavelength $\lambda$ from the recording light source 1 is incident on the acoustooptic deflector 14. As a result, diffracted beams Sb and Rb respectively corresponding to the carrier wave CF and the lower sideband signal are output from the acoustooptic deflector 14 at different angles of diffraction.

These two diffracted beams Sb and Rb are collimated by the collimator lens 15. The diffracted beam Sb is incident on the spatial light modulator 4 to be provided with two-dimensional information. The resulting beam is output as the signal beam SNb. The signal beam SNb is focused by the objective lens 16 to be incident at a predetermined position on the moving recording medium 5. Meanwhile, the diffracted beam Rb collimated by the collimator lens 15 is focused by the objective lens 16 to be incident, as the reference beam RF, on the incident region of the signal beam SN on the recording medium 5 at an angle of incidence determined by the frequency $v_i \pm \Delta v$ of the input signal IS and the wavelength $\lambda$ of the incident laser beam RB. With this operation, the signal beam SNb and the reference beam RFb interfere with each other on the surface of the moving recording medium 5, thus recording interference fringes generated by the two beams.

As has been described above, according to the present invention, since the directions of incidence of the diffracted beams S and R from the acoustooptic deflector 14, i.e, the signal beam SN and the reference beam RF, onto the recording medium 5 can be controlled in accordance with the inclination of the recording medium 5, the angular resolution in multiplexed recording is not limited by the axial runout and warpage of the moving recording medium 5. Therefore, a large-capacity storage apparatus can be realized.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An information recording apparatus comprising:
   a recording light source for generating a laser beam;
   carrier wave generating means for generating a carrier wave having a predetermined frequency;
   input signal generating means for generating an amplitude modulation input signal having a frequency different from that of the carrier wave;
   amplitude modulating means, connected to said carrier wave generating means and said input signal generating means, for performing amplitude modulation of the carrier wave with the input signal;
   acoustooptic deflecting means, connected to said amplitude modulating means, for receiving the laser beam from said recording light source and diffracting the laser beam in two directions by using an amplitude-modulated signal from said amplitude modulating means;
   diffracted beam modulating means for providing predetermined information for one of the diffracted beams, of the laser beam, diffracted in one direction by said acoustooptic deflecting means, and modulating the diffracted beam to form a signal beam; and
   movable recording medium means, on the same incident region of which the signal beam from said diffracted beam modulating means and the diffracted beam as a reference beam, of the laser beam, diffracted by said acoustooptic deflecting means in a direction different from a direction of diffraction of the signal beam are radiated, thereby performing recording based on interference between the signal beam and the reference beam.

2. An apparatus according to claim 1, wherein said acoustooptic deflecting means receives a single laser beam from said recording light source at a predetermined angle of incidence, and generates a single carrier wave beam diffracted in one direction and also generates a plurality of sideband beams diffracted at different angles, one after another, in accordance with amplitude-modulated signals having different frequencies from said amplitude modulating means, and said sideband beams are applied to said recording medium at different angles of incidence, and said carrier wave beam is applied to said recording medium at an angle of incidence and interferes with the said side wave beams, thereby performing multiplexed recording on said recording medium.

3. An apparatus according to claim 2, wherein the switchable amplitude modulation signals are obtained by switching a frequency of the amplitude modulation input signal.

4. An apparatus according to claim 2, wherein the switchable amplitude modulation signals are obtained by switching a frequency of the carrier wave generated by said carrier wave generating means.

5. An apparatus according to claim 1, wherein said acoustooptic deflecting means receives a single laser beam from said recording light source, and generates a plurality of carrier wave beams diffracted at different angles, one after another, and also a plurality of sideband beams diffracted at different angles, one after another, in accordance with amplitude-modulated signals having different frequencies, from said amplitude modulating means said beam modulating means comprises a plurality of modulating means for modulating the amplitudes of said carrier wave beams, respectively, and said sideband beams are applied to said recording medium at different angles of incidence, and said carrier wave beams amplitude-modulated by said beam modulating means are applied to said recording medium at different angles of incidence and interfere with said sideband beams, thereby performing multiplexed recording on said recording medium.

6. An apparatus according to claim 1, wherein said recording light source for generating the laser beam comprises a plurality of laser beam sources having different wavelengths, said acoustooptic deflecting means diffracts the laser beam in two directions to form a carrier wave diffracted beam and a lower sideband diffracted beam at angles of diffraction determined by a frequency of an amplitude-modulated signal from said amplitude modulating means and a predetermined wavelength of a laser beam from said laser beam source, said diffracted beam modulating means comprises a plurality of diffracted beam modulating means arranged in correspondence with carrier wave diffracted beams respectively determined by laser beams having different wavelengths, and said recording medium means receives a signal beam and a reference beam, which are incident at angles of incident respectively determined by said laser beams having different wavelengths from said laser beam sources, at the same recording region so as to cause interference, thereby performing multiplexed recording on a moving recording medium.

7. An apparatus according to claim 1, which further includes inclination detecting means for detecting an inclination of said recording medium means with respect to a reference position, and outputting a corresponding detection signal; and means, connected to said carrier wave generating means and said input signal generating means, for causing said carrier wave generating means and said input signal generating means to generate carrier waves and input signals respectively having frequencies obtained by shifting reference frequencies, of said carrier wave generating means and said input signal generating means, corresponding to a reference position of said recording medium means, in accordance with an inclination detected by said inclination detecting means, thereby controlling angles of incidence of the signal and reference beams as the diffracted beams on said recording medium means in accordance with the inclination.

* * * * *